US006961118B2

(12) United States Patent
Rolon et al.

(10) Patent No.: US 6,961,118 B2
(45) Date of Patent: Nov. 1, 2005

(54) CONTINUOUS PAPER FEED SYSTEM

(75) Inventors: Arnoldo Rolon, Houston, TX (US); Harold Andrade, Houston, TX (US); John Salyer, Houston, TX (US)

(73) Assignee: Baker Hughes, Incorporated, Houston, TX (US)

( * ) Notice: Subject to any disclaimer, the term of this patent is extended or adjusted under 35 U.S.C. 154(b) by 0 days.

(21) Appl. No.: 10/617,645

(22) Filed: Jul. 11, 2003

(65) Prior Publication Data

US 2004/0160593 A1 Aug. 19, 2004

Related U.S. Application Data

(60) Provisional application No. 60/446,800, filed on Feb. 12, 2003.

(51) Int. Cl.[7] ................................................ G03B 42/27

(52) U.S. Cl. ............................ 355/75; 355/40; 355/72; 355/405

(58) Field of Search ............................ 355/40, 41, 72, 355/75, 402

(56) References Cited

U.S. PATENT DOCUMENTS 3,859,960 A * 1/1975 Lloyd ......................... 399/164
4,651,605 A 3/1987 Dean
5,279,536 A * 1/1994 Abreu ..................... 226/118.1
5,676,479 A 10/1997 Yamaguchi
5,905,520 A * 5/1999 Fujii et al. .................. 347/153
6,290,406 B1 9/2001 Gauthier
6,384,929 B1 5/2002 Miller

* cited by examiner

*Primary Examiner*—D. Rutledge
(74) *Attorney, Agent, or Firm*—Timothy Donougue; Keith R. Derrington

(57) ABSTRACT

A paper handler, in combination with a printer comprising, a paper inlet into that which paper enters the paper handler; where the paper has leading edge. The paper handler further comprises a paper exit where paper exits the paper handler and travels from the paper handler to the inlet of the printer. A drag system is also included that contributes to handle the paper handled by the paper handler thereby providing for seamless continuous paper flow through the printer. The paper handler further comprises an optic sensor capable of sensing marks on the paper. The optic sensor communicates with the printer indicating sensing of the marks by the optic sensor.

32 Claims, 9 Drawing Sheets

VIEW A-A

CONTINUOUS PAPER FEED SYSTEM

RELATED APPLICATIONS

This application claims priority from co-pending U.S. Provisional Application No. 60/446,800, filed Feb. 12, 2003, the full disclosure of which is hereby incorporated by reference herein.

BACKGROUND OF THE INVENTION

1. Field of the Invention

The present invention is directed to an apparatus and method capable of handling a continuous stream of paper for insertion into a printer. More specifically the present invention can be combined with standard printers to enable the printer to seamlessly print a continuous print job.

2. Description of Related Art

Many print job applications contain too much information to fit on a single sheet and therefore require multiple continuous sheets in order to properly execute the print job. Examples of such print job applications include graphics that depict data recorded over time or distance, such as electrocardiograms, hydrocarbon well data and the like. However most printers are designed to handle single sheets, thus the handling capabilities that direct the paper through the printers are not sufficiently sensitive to direct a continuous stream of paper through the printer without the paper going off track of the printer and jamming or wrinkling.

Therefore, there exists a need for handling a continuous stream of paper for insertion into a printer in order to provide a seamless printing of a continuous stream of paper within the printer.

BRIEF SUMMARY OF THE INVENTION

A paper handler, in combination with a printer comprising, a paper inlet into that which paper enters the paper handler; where the paper has leading edge. The paper handler further comprises a paper exit where paper exits the paper handler and travels from the paper handler to the inlet of the printer. A drag system is also included that contributes to handle the paper handled by the paper handler thereby providing for seamless continuous paper flow through the printer. The paper handler further comprises an optic sensor capable of sensing marks on the paper. The optic sensor communicates with the printer indicating sensing of the marks by the optic sensor.

An automatic paper advance system is included with the paper handler that automatically positions the leading edge of the paper proximate to the printer inlet. The printer should be provided with a paper sensor that senses paper at the printer inlet and where the automatic paper advance system is in communication with the printer such that when the printer senses paper proximate to the printer inlet, the automatic paper advance system terminates paper feed to the printer inlet. To facilitate the functions of the paper handler, the paper handler is in communication with the printer. The printer used in combination with the present invention can be an off the shelf printer that is modified to be in operative cooperation with the paper handler.

The paper handler of the present invention is capable of producing a drag force onto the paper, where the drag force onto the paper is preferably uniform across the width of the paper. The drag force can be applied by forming a tension block disposed proximate to and parallel with a tension rod. In the preferred mode of operation, the paper is threaded between the tension block and the tension rod, where the tension block and the tension rod cooperate to exert a drag force on the paper.

The paper handled by the paper handler can be a paper stream comprising a continuous stream of paper, a single sheet of paper, including any material on which print toner can be applied, such as film, clear plastic, transparencies, and other substantially transparent or translucent materials. Also included with the paper handler is a paper cutter that cuts the paper within the paper handler. The paper handler controller operatively communicates with the paper cutter and directs the paper cutter to cut the paper within the paper handler.

The present invention also includes a method of handling a continuous feed of paper through a paper handler and a printer comprising the steps of directing paper into a paper handler having an inlet and an outlet, where the paper into the paper handler enters the inlet and paper exiting the paper handler exits the outlet. The steps also include directing the paper exiting the paper handler into the inlet of the printer; and handling the paper within the paper handler to provide for continuous seamless paper flow through the printer. The paper used in conjunction with the present invention should have a leading edge. Also included with the method is sensing the presence of the leading edge of the paper proximate to the printer inlet. The paper handler forwards paper from it to the printer inlet until the leading edge of the paper is sensed proximate to the printer inlet. Then the leading edge of the paper is drawn into the printer inlet after the leading edge of the paper is sensed proximate to the printer inlet.

During use, the present invention senses for top of form indicators and can execute a print job after a top of form indicator has been sensed. The method of the present invention further comprises monitoring the paper travel through the printer to determine if a paper jam has occurred. A paper jam can be detected by monitoring the paper travel through the printer by directing the paper exiting the printer across a magnetized wheel thereby rotating the magnetized wheel when paper movement is occurring such that a detectable oscillating magnetic field is produced when the paper continues to exit the printer. Also included is the ability to monitor the magnetic field produced by the rotating magnetic wheel and terminate printer operations when the magnetic field ceases that is produced by the rotating magnetic wheel.

The status of a print job can be monitored to determine the completion of a print job and then advance paper to the top of form position upon the completion of a print job. A determination of a pending print job can be evaluated, and then the paper cut upon the completion of a print job and the determination that no print job is pending for printing.

The paper handler includes a paper handler controller and the printer includes a printer controller, where the paper handler controller monitors the paper handler and provides control commands to the paper handler and to the printer controller, and where the printer controller monitors the printer and provides control commands to the printer and to the paper handler controller. The method of the present invention further comprises modifying the printer to receive data from the paper handler and to transmit data to the paper handler. The printer controller can be modified to receive data from the paper handler controller and to transmit data to said paper handler controller.

A method of printing onto a continuous stream of paper comprising the steps of: coupling a paper handler with a printer; adding top of form indicators to the continuous stream of paper; feeding the leading edge of the continuous stream of paper through the paper handler to the paper inlet of the printer; sensing for the top of form indicators; receiving a print job into the printer; and monitoring when a top of form indicator has been sensed and initiate printing the print job onto the continuous stream of paper at that time.

DETAILED DESCRIPTION OF THE INVENTION

Figure 1:
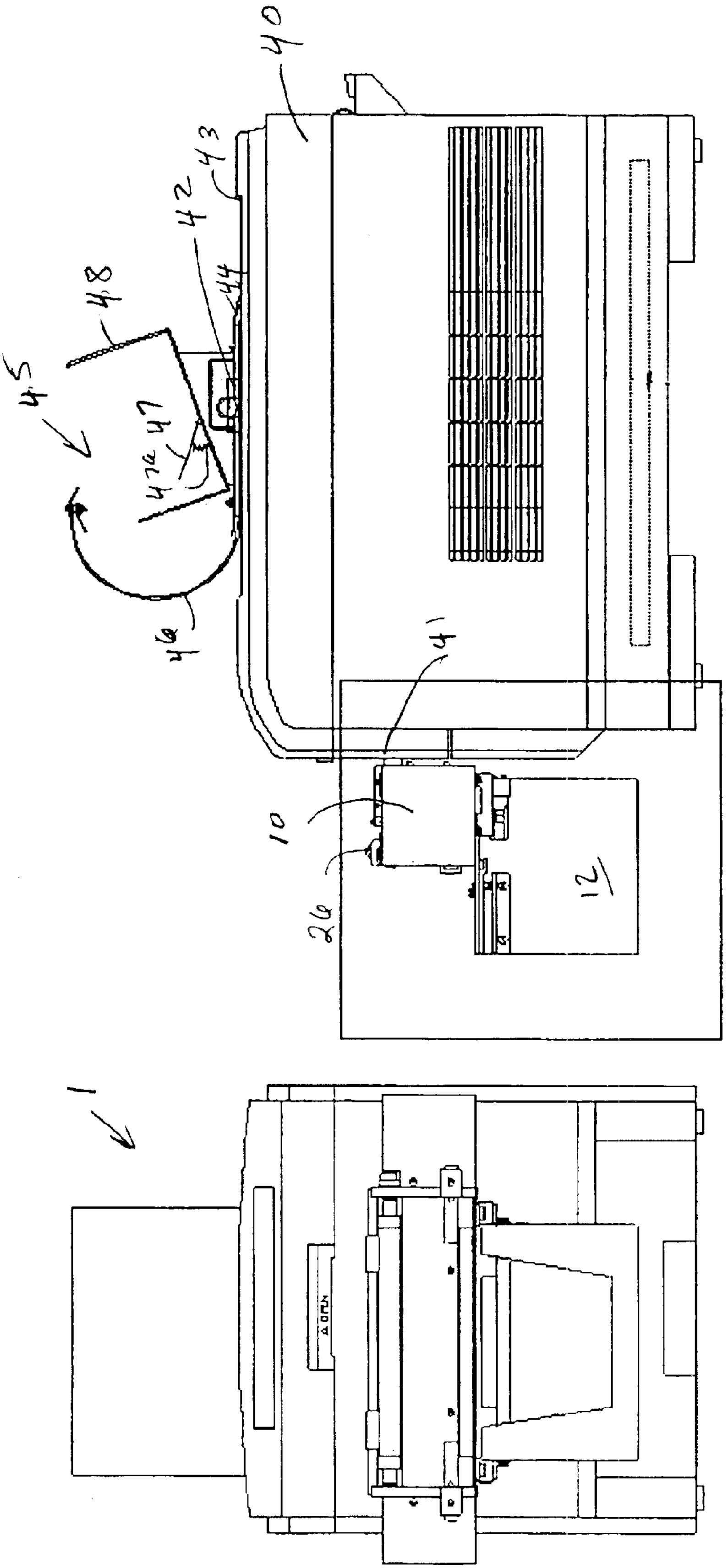
FIG. 1 depicts one embodiment of a paper handler with a printer.

With reference to the drawing herein, one embodiment of the present invention is illustrated in FIG. 1 that comprises a paper handler 10 coupled with a printer 40 to form a combination 1. One of the novel features of the combination is the ability of the paper handler 10 to deliver paper to the printer inlet 41 in a fashion that prevents the paper from binding, wrinkling, tearing, or otherwise jamming. The paper handler 10 is capable of providing a smooth feed to the printer inlet 41 when the paper being fed to the printer 40 is a single sheet, multiple single sheets, or comprised of a continuous stream of paper. The paper used with the present invention is not limited to traditional paper made from, for example, wood pulp and the like, but includes any material on which print toner can be applied, such as film, clear plastic, transparencies, and other substantially transparent or translucent materials. Additionally, the paper handler 10 is also capable of cooperating with the printer 40 to initiate print jobs at specified locations on the printed page as well as certain pages on a paper stream, especially on fan-fold paper. The paper handler 10 also provides a way for the printer 40 to compare the size of pending print job(s) with the paper remaining within the paper bin 12 and determine if enough blank sheets are available for the print job.

Figure 2:
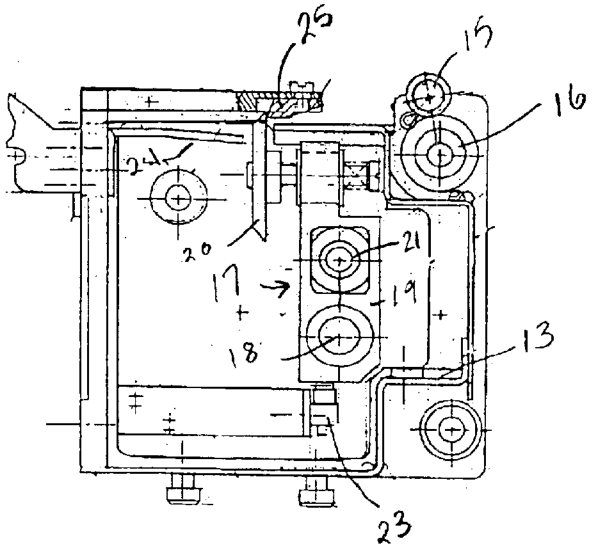
FIG. 2 illustrates a cross sectional view of a portion of one embodiment of a paper handler.
Figure 2:
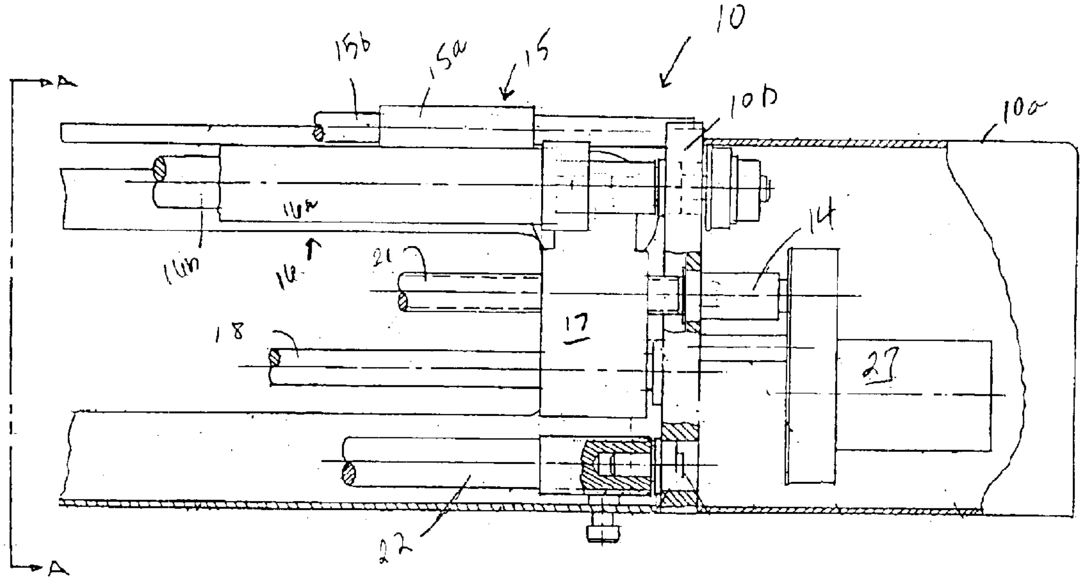
Figure 3:
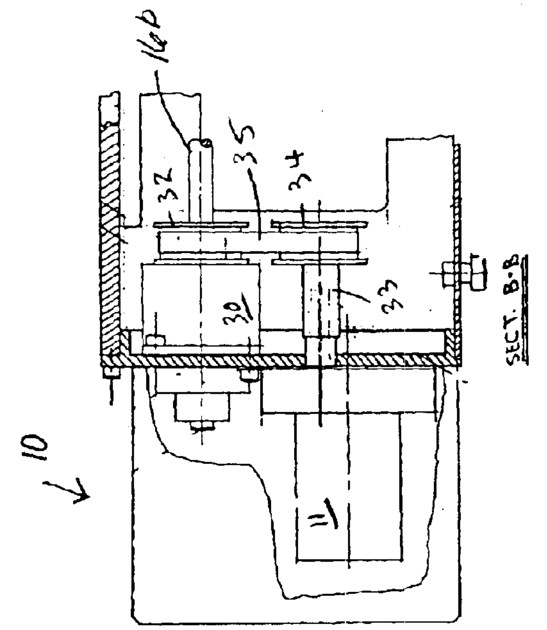
FIG. 3 illustrates a cross sectional view of a portion of one embodiment of a paper handler.
Figure 3:
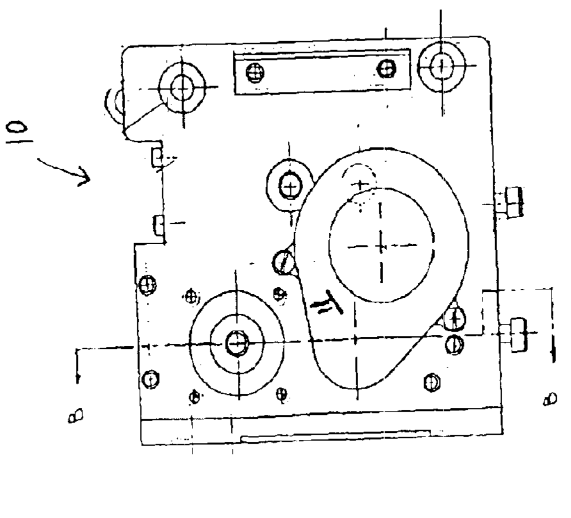

A cut away view of one embodiment of the paper handler 10 is shown in more detail in FIGS. 2 and 3. The paper to be printed on can be stored in the paper bin 12 that is located beneath the main body of the paper handler 10. The paper is coupled to the paper handler 10 by bringing it upward from the paper bin 12 across the front face of the paper handler 10 and feeding the paper between the pinch roller assembly 15 and the paper feed assembly 16. The paper can then be fed into the printer inlet 41 through the paper handler 10 by activating the paper advance switch 26. The paper advance switch 26 energizes the motor 11 that in turn rotates the paper feed assembly 16 via a clutch, belt, and pulleys. More specifically, the motor 11 is provided on one end of the paper handler 10 and when energized provides rotative motive force to the roller pulley 34 via a coupling 33. When the motor 11 is energized and the clutch 30 is engaged, the rotation of the motor pulley 34 will produce rotation of the paper feed assembly shaft 16*ba* via the belt 35. Rotating the paper feed assembly shaft 16*b* in turn produces corresponding rotation of the paper feed assembly roller 16*a,* thus motivating paper across the paper handler 10 that has been inserted between the paper feed assembly 16 and the pinch roller assembly 15. Since the motor 11 is primarily activated to move paper within the paper handler 10 only up to the printer inlet 41, as soon as the leading edge of the paper is sensed at the printer inlet 41, the clutch 30 can be disengaged thereby decoupling the motor 11 from the paper feed assembly 16.

The ability to readily disengage the motor 11 from the paper feed assembly 16 is not only advantageous with regard to accurately positioning paper at the printer inlet 41, but also when paper is being motivated only by the printer 40 itself. During printing when the printer 40 is solely responsible for moving paper through the combination 1 the paper will be pulled through the paper handler 10 by the force applied by the printer 40, if the paper feed assembly 16 was coupled to the motor 11 at that time, the backdrive of the motor 11 could produce a drag onto the paper, thus possibly interfering with the paper flow through the printer 40. Instead, when the paper is being printed onto and moved only by the printer 40, the paper flows through the paper feed assembly 16 and the pinch roller assembly 15 without drag or resistance introduced by the paper feed assembly 16 or the pinch roller assembly 15. The paper feed assembly 16 and the pinch roller assembly 15 is fitted with low friction ball bearings to reduce rolling resistance to a minimum. It is preferred that a housing 10*a* be provided to protect the motor 11 from being damaged by unintended impacts as well as damage from moisture, dirt, and other contaminants. However the advantages of the present invention can be realized by a housing 10*a* that secures the component parts of the paper handler 10 without fully encompassing or sealing those parts.

A drag system is included with the paper bin 12 that comprises, a tension block 49 and a tension rod 50. Before inserting the top of paper 65 into the paper handler 10, the top of paper 65 (or leading edge of the paper) should be first disposed between the tension block 49 and the tension rod 50. A drag force is exerted onto the paper stream 60 as it passes between the tension block 49 and the tension rod 50. It is preferred that the drag force be constant or uniform across the length where the paper is between the tension block 49 and the tension rod 50. It is also preferred that the length of the tension block 49 and the tension rod 50 should be at least as long as the width of the paper stream 60 passing through the drag system. However the length of the tension block 49 and the tension rod 50 can be greater or less than the width of the paper stream passing through the drag system. The drag force produced by the drag system exerts a counter force to the pulling force produced by the printer 40. Because it is desirable to produce a counter force that is uniform across its length, the drag force produced by the tension block 49 and the tension rod 50 should be substantially uniform across the width of the paper. Countering the printer pull force with a uniform force ensures that the paper stream 60 entering the printer 40 proceeds in a straight line into the printer 40 and prevents any oblique angles between the paper stream 60 and the printer inlet 41. Thus a seamless and continuous paper flow through the printer 40 can be achieved by the addition of the novel paper handler 10. As paper is entering the printer 40, the angle between the edge of the paper stream 60 and the printer inlet 41 should be substantially at 90°. When the angle between the edge of the printer stream 60 and the printer inlet 41 begins to deviate from 90°, the probability increases of jams, wrinkling, and other undesirable episodes of the paper stream 60 within the printer 40. While single sheets of paper can be successfully fed into a printer even when the angle between the paper edge and the printer inlet is not substantially at 90°, a continuous stream of paper will certainly become "off track" and jam or become stuck within the printer 40 if it is positioned at an oblique angle with respect to the printer inlet 41. While the drag force can vary with the type of paper stream 60 involved, the magnitude of the drag force can be determined by those skilled in the art without undue experimentation. Further, a spring can be added behind the tension block 49 where the spring urges the tension block 49 against the tension rod 50 to produce a drag force onto the paper stream 60. The spring constant of the spring can be adjusted in order to obtain a suitable drag force that ensures straight passage of the paper stream 60 into the printer inlet 41.

The printer 40 can be chosen from any one of a number of "off the shelf" printers, or can be manufactured specifically to mate with the paper handler 10. In addition to the typical printing functions, the printer 40 should also be programmable in order to properly communicate with the paper handler 10. Proper communication between the printer 40 and the paper handler 10 not only involves transmitting and receiving data between each other, but also includes the ability to send a signal from the paper handler 10, for example, to the printer 40 that commands a function within the printer 40. Conversely, signals sent from the printer 40 should also be able to produce a function within the paper handler 10. The printer 40 should also include a sensor that senses when the beginning of a page of paper (the top of page) is located proximate to the printer feed such that the devices internal to the printer 40, such as a magnetic belt can draw the paper into the printer 40 for processing.

In operation, electrical power is provided to both the paper handler 10 and to the printer 40 by setting a switch (not shown) located on the printer 40 into the on position. It is preferred that the electrical power supply be 120 volts at 60 hertz, however the electrical power supply can be of different volts or hertz as long as system is provided with proper electrical transformers to "step down" the voltage to the printer 40, the paper handler 10, and their specific component parts. One skilled in the art can readily determine proper transformers for use without undue experimentation. Upon electrical power being supplied to the printer and controller, both will undergo an initialization process. The process is software driven and verifies adequate memory, polls communications, etc.

After the initialization of the printer 40 is complete, the beginning of page sensor within the printer initiates sensing if the paper is properly positioned at the printer feed so the paper can be drawn into the printer 40. When the beginning of page sensor detects paper properly positioned at the printer feed, the printer 40 has been programmed to send a command to the paper handler 10 to cease forwarding paper to the printer 40. This is the command that disengages the paper feed assembly 16 from the motor 11 by deactivating the clutch 30 while still allowing the paper feed assembly 16 to freely rotate without impeding free flow of paper through the paper handler 10. This feature of the present invention enables an operator of the combination 1 to position paper at the printer inlet 41 by activating the paper advance switch 26. Also, if paper is already properly positioned at the printer inlet 41 when the paper advance switch 26 is activated (either accidentally or inadvertently), the combination 1 will not advance paper into the printer 40 since the clutch 30 remains deactivated as long as paper is sensed at the printer inlet 41. Enabling this type of communication between the paper handler 10 and the printer 40 is another important feature of the present invention that works to prevent miscues such as paper jams.

Figure 8A:
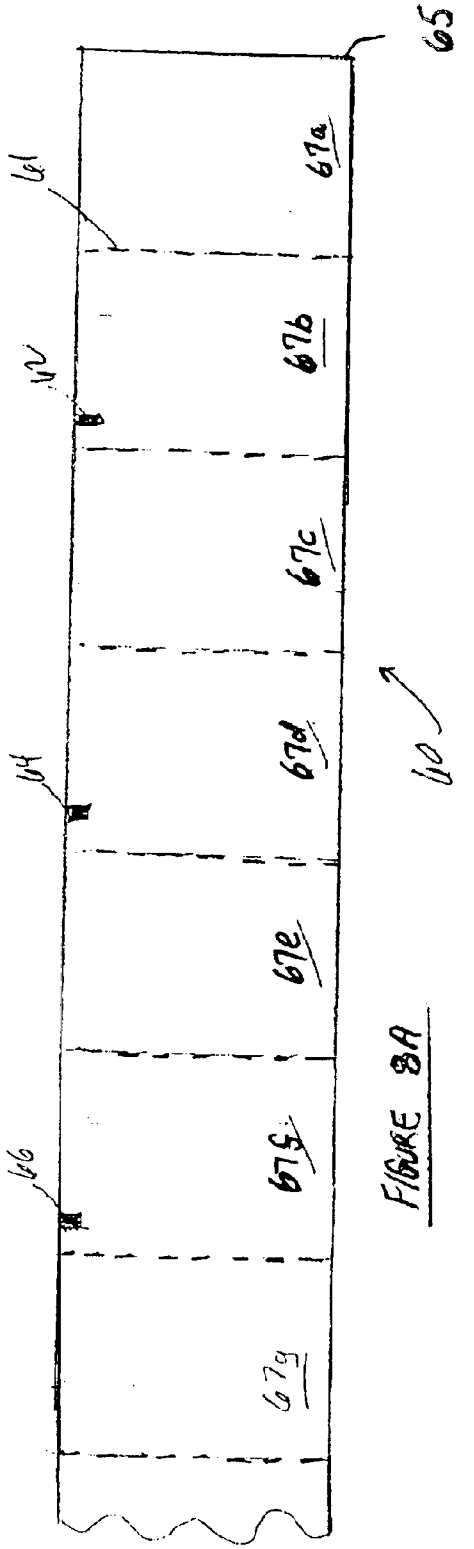
FIGS. 8*a*–8*c* display paper that can be used in conjunction with the present invention.
Figure 8C:
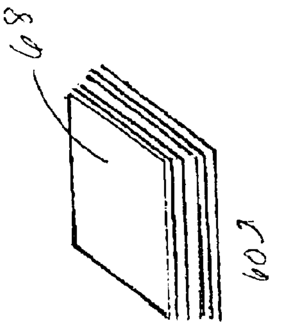
Figure 8B:
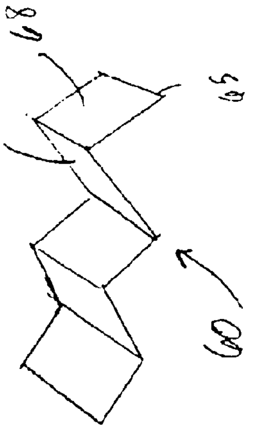
Figure 9B:
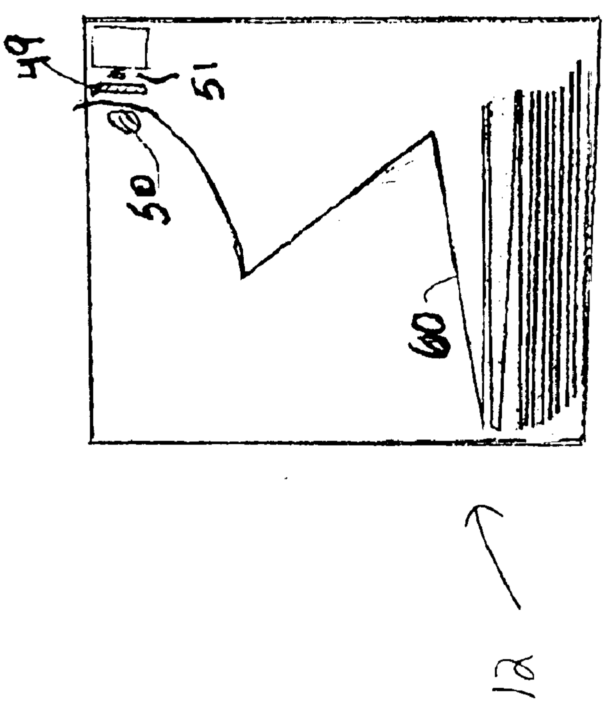
FIG. 9*b* depicts paper flow through an embodiment of a drag device.
Figure 9A:
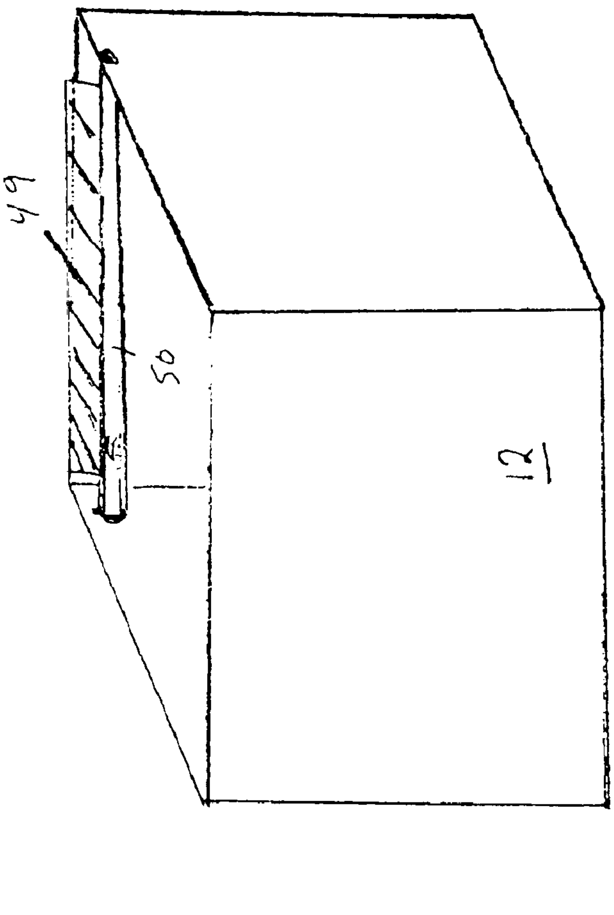
FIG. 9*a* illustrates one embodiment of a drag device.

One of the many novel features of the present invention is its capability to initiate every print job at a specific site on the paper being fed into the printer 40. Further, the printing can be initiated at the specific site in spite of some slippage of the paper at the printer feed. Numerous advantages are realized by this capability, for example, when the paper being printed on is fan fold paper (as illustrated in FIG. 8), the printing can initiate either on the upward looking page 68 or the downward facing page 69. When printing on fan fold paper, it is desired that the printing initiate at the top of the upward looking page 68 instead of the downward facing page 69 so the printed print job can be readily identified and located without having to turn over the top page to view the job underneath. The ability of the present invention to print at a specific site is not limited to print jobs processed at the beginning of a continuous feed of paper, but instead each print job can be printed at a specifically designated site, even if the particular print job is between other print jobs in a print queue and is ultimately printed somewhere in the middle of a continuous feed of paper. Thus if multiple print jobs are printed on a continuous feed of paper, each print job can be printed on a specific site on the paper, such as on the top of form. Otherwise subsequent print jobs might be printed adjacent each other on the paper thereby making it difficult to separate the particular printouts and thus hard to store for future reference. The paper handler 10 is not limited to applications of continuous fan-fold paper, but can also handle rolls of paper, or individual sheets of paper.

The present invention utilizes an optic sensor 13 in combination with marks on the non-printed side of the paper to facilitate initiating print jobs at the specific site on the paper, which is generally the top of form. As is known in the art, the location on the specific page where the print job initiates is also known as the "top of form" location. The marks are added to the non-printed side of the paper prior to the paper being fed into the printer 40. It is appreciated that those skilled in the art can produce marks on the non-printed side of the paper without undue experimentation. When the paper is fan-fold paper, it is preferred that the marks be on the non-printed side of every other sheet instead of on the non-printed side of every sheet. The marks should be positioned on a location of the paper so that the marks pass across the optic sensor 13 and are detectable by the optic sensor 13. Since the distance between the mark and the position on the paper where printing is to be initiated is measurable and therefore known, the location of the specific site on the paper where printing is to be initiated can easily be determined. When the optic sensor 13 detects the mark or series of marks, the print job can then be initiated thus ensuring that the print job prints onto the paper at the designated specific site. There are several ways that this sequence can be accomplished. Top of form monitoring occurs at the initial printing of every print job, irrespective of where the print job lies in the print queue, the print job can be first, last, or in the middle of the print queue. Thus when monitoring the marks to determine when to initiate printing of a print job, and the print job is not the first in the print queue, the marks will only start to be monitored after the previous print job has been completed.

For the purposes of illustrating the preferred method of initiating a print job, a segment of a paper stream 60 is shown in FIG. 8. Perforations 61 separate the paper stream 60 into individual sheets 67 on which marks are printed. While each mark on the paper stream 60 should be substantially indistinguishable from other marks, for illustrative purposes the marks in FIG. 8 have been numbered as the first mark 62, the second mark 64, and the third mark 66.

The preferred method of situating the paper stream 60 to the top of form position within the printer 40 first involves monitoring the number of marks that are detected by the optic sensor 13. As the paper passes through the paper handler 10 the marks will pass by the optic sensor 13 and their presence will be sensed as the marks travel past the optic sensor 13. When the optic sensor 13 detects the second mark 64, the paper handler 10 forwards a signal to the printer to begin printing the print job currently residing within the print queue. Should more than one print job be in the print queue, the job printed is generally the next job in the print queue but can be any of the jobs in the print queue. In the example demonstrated herein, the first and second marks detected by the optic sensor would be marks 62 and 64. Thus the print job sequence will be initiated when the optic sensor 13 senses the mark 64. In the preferred print job sequence printing will initiate on the paper stream 60 on sheet 67*e*. This is accomplished by first programming the printer with the distance between the top of sheet 67*e* and the location within the printer where printing is initiated (the programmed distance). The printer is further programmed to track the distance that the paper stream 60 has traveled within the printer (the tracked distance), and when the tracked distance equals to the programmed distance the printer 40 will initiate the print job and begin printing onto the paper stream 60 at the top of sheet 67*e*.

Implementation of the preferred print sequence results in four blank pages at the beginning of every print job (i.e. sheets 67*a*–67*d*). While a print sequence could be employed that reduces or minimizes the number of blank pages associated with each print job, the complexity and cost associated with applying this procedure is prohibitive. Moreover a distinct advantage is realized by not printing on the first sheets of each print job. For example, it has been found that passing blank sheets through the printer subsequent to printing large print jobs has a cleaning effect on the printer 40 thereby substantially reducing smudges or marks on the sheets of print jobs performed after passing the blank pages through the printer 40. The present invention enables seamless print jobs in excess of 10,000 pages.

Another advantage realized by utilization of the optic sensor 13 to monitor and record the marks that travel past the optic sensor 13 is that the volume of paper remaining in the paper bin 12 can be gauged. If the number of sheets in the paper stream 60 is known when the paper stream 60 is placed into the paper bin, that number can be recorded or programmed into the paper handler 10 or printer 40. As print jobs are processed by the combination 1 the number of sheets will be counted by the paper handler 10 thus revealing the number of sheets that remain in the paper bin 12. Before the printer 40 initiates each print job, the size of the pending print job can be compared to the number of sheets that remain in the paper bin 12. If the print job requires more sheets than are available in the paper bin 12, the printer 40 or paper handler 10 can be programmed to provide an error message indicating that an insufficient amount of paper is within the paper bin 12. Upon receiving an error message that insufficient paper is within the paper bin 12, an operator can replenish the paper within the paper bin 12. If the print job proceeds when insufficient paper is within the paper bin 12, that print job will generally need to be reprinted. Accordingly, always having sufficient paper within the paper bin 12 eliminates wasting paper, time, and printer toner.

Another option of utilizing the marks in combination with the optic sensor 13 is that the optic sensor 13 can be physically located a definite measured distance away from the printer 40 such that when a mark is detected by the optic sensor 13, the printer 40 will immediately initiate the print job. A further algorithm can be added to the printer that accounts for the speed of the paper moving to the printer 40 and calculates the exact time to initiate printing onto the paper at the location where printing is to be initiated. It is to be appreciated that one skilled in the art can ascertain the details of programming the printer and developing such an algorithm without undue experimentation.

The paper handler 10 preferably includes a paper handler controller 28 that interprets data transmissions from the printer 40, activates and deactivates the motor 11, and operates the paper cutter motor 27. It is further preferred that the paper handler controller 28 be comprised of a Basic Stamp 2 micro-controller housed within the paper handler 10 itself. The micro-controller can be managed by a Windows or DOS software editor, which can be ported through a personal computer. This porting enables changes to the firmware within the paper handler controller 28 to be made while the paper handler 10 is in operation without disassembling the paper handler 10. The preferred software is high level Pbasic that simplifies editing the firmware.

Figure 7:
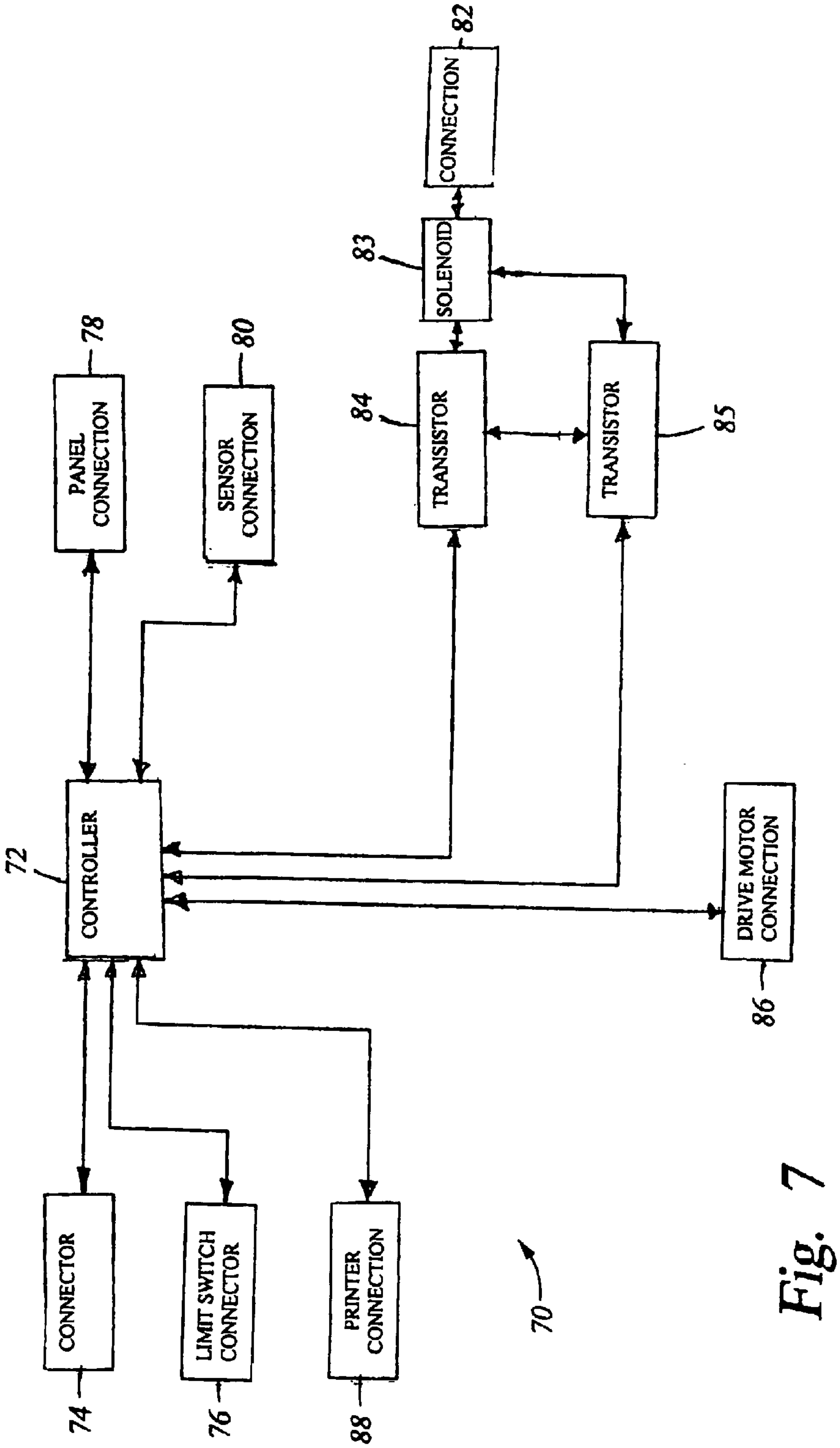
FIG. 7 contains a schematic of one embodiment of a paper handler controller.

Referring now to FIG. 7 where the controller schematic 70 is illustrated. The controller 72 as shown is the preferred 24 pin basic stamp. However, the present invention can include any controller capable of executing the required controller tasks based on data inputs to the controller. Included within the controller schematic 70 is a connector 74 that provides data communication between the paper handler 10 and the controller 72. The micro-controller interface can sense action calls from 4 inputs, two plotter host inputs and two manual inputs. The sensed action calls request either paper feed or paper cut, and both paper feed and paper cut commands can come from the printer, or from the buttons provided on the paper handler 10. A fifth input monitors a paper top of form mark sensor from the optic sensor 13 and a sixth and seventh input monitors the position of the cutter body 19. The sensed action calls and top of form sensing are translated by the controller 72 into motor controls including drive speed, timing and condition testing. Condition testing includes a check to determine if the cutter motor is moving and if it is moving at a proper rate of speed. Condition testing also evaluates the sequence of commands to ensure the commands are in the proper sequence, if the commands are out of sequence, an error message will be provided to a panel light provided on the paper handler 10. Condition testing further includes keeping track of the top of form marks to monitor how much paper has been fed through the printer and can thus determine the amount of paper remaining in the paper bin 12.

The interface features a pulse report to the printer 40 when the paper cutter functions are complete. Communications between the controller 72 and the printer 40 are provided via the printer connection 88. The panel indicator provided on the paper handler 10 shows operational conditions, error conditions, and paper top of form mark detections to the operator. Operational data is transmitted to the panel indicator through the panel connections 78 that connect the panel indicator with the controller 72.

The preferred interface of the paper handler controller 28 receives +35 volts, 35 volt common, +5 volts, a +5 volt common, two control inputs (paper cut, paper feed) and one output test line for top of form sensing. Data communication between the controller 72 and the optic sensor 13 is supplied via the top of form sensor connection 80. The +5 volt supply input from the printer 40 powers the logic of the paper handler controller 28. Both 35 volts and 5 volts are supplied through connector J8 of the Basic Stamp. The paper handler controller 28 senses at least four inputs, two inputs from the printer 40, i.e. host paper cut and host paper feed. The control inputs from the printer 40 are active low. Two other inputs to the paper handler controller 28 are manual paper feed and manual paper cut. All inputs are acted upon in singularity, where only command is operable at a time.

During either the host or manual paper cut modes, a 100 ms pulse is used to mark the completion of the paper cut cycle on the top of form, or the end of cut (when the paper has been fully cut). The printer 40 can monitor this test line when it initiates a paper cut command to sense when the cutter wheel 20 has completed its travel across the paper. Another advantage of the present invention is coding the firmware to ramp power to the motor over a 0.25 second interval. Ramping the power to the motors of the paper handler 10 reduces the current required in order to bring the motor to full operational speed. Motor controls are supplied to the motor 11 through the drive motor connection 86.

The preferred operation of the paper cutter only cuts the paper when the printer 40 senses that the print queue is empty. Thus the paper cutter will not be activated between specific print jobs but waits until all print jobs within the printer 10 have been completed. The paper handler 10 (preferably within the paper handler controller 28) receives a call from the printer 40 as soon as the final print job in the queue has completed and no other print jobs have entered the printer 40. Upon receiving this call, the paper handler 10 activates the paper cutter motor 27 that in turn rotates the lead screw 21 via the coupling 14. As the lead screw 21 rotates the cutter body 19 and cutter wheel 20 is traversed across the paper handler 10 cutting the paper. The cutter body 19 has two apertures horizontally formed perpendicular to the cutter wheel 20, in one aperture the lead screw 21 rotates which provides translational movement of the cutter assembly. The other aperture receives the support bar 18 that provides support and guidance for travel of the cutter body 19. The actual cutting process occurs by pinching the paper between the cutter wheel 20 and the cutter blade 25. The paper handler controller 28 monitors the position of the cutter body 19 by the use of limit switches (not shown) and will deactivate the paper cutter motor 27 after it completes its travel across the width of the paper. The data from output from the limit switches of the cutter body is connected to the controller 72 through limit switch connectors 76. Further, the paper handler controller 28 maintains in its memory the location of the cutter body 19 so that on subsequent cuts the paper handler controller 28 rotates the lead screw 21 in the opposite rotation. The function of the alternative cutter direction is accomplished by the solenoid 83 in combination with the transistors 84 and 85. Control data is supplied to the paper cutter motor 27 via the connection 82. This action prevents unnecessary movement of the paper cutter across the paper handler 10, thereby conserving energy and reducing wear on the component parts of the paper cutter.

Figure 4:
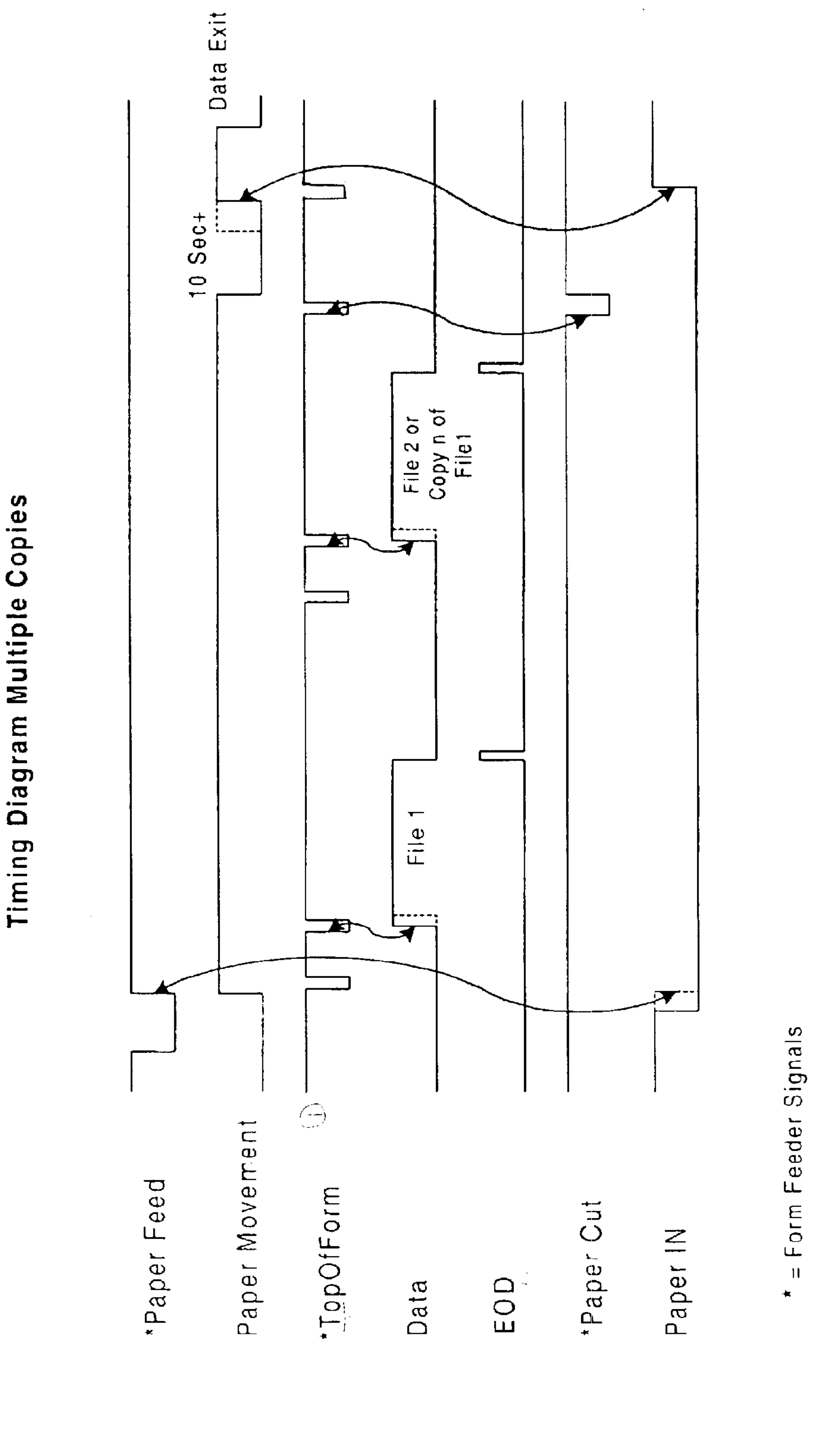
FIG. 4 contains a timing diagram for use with one embodiment of the present invention.
Figure 5:
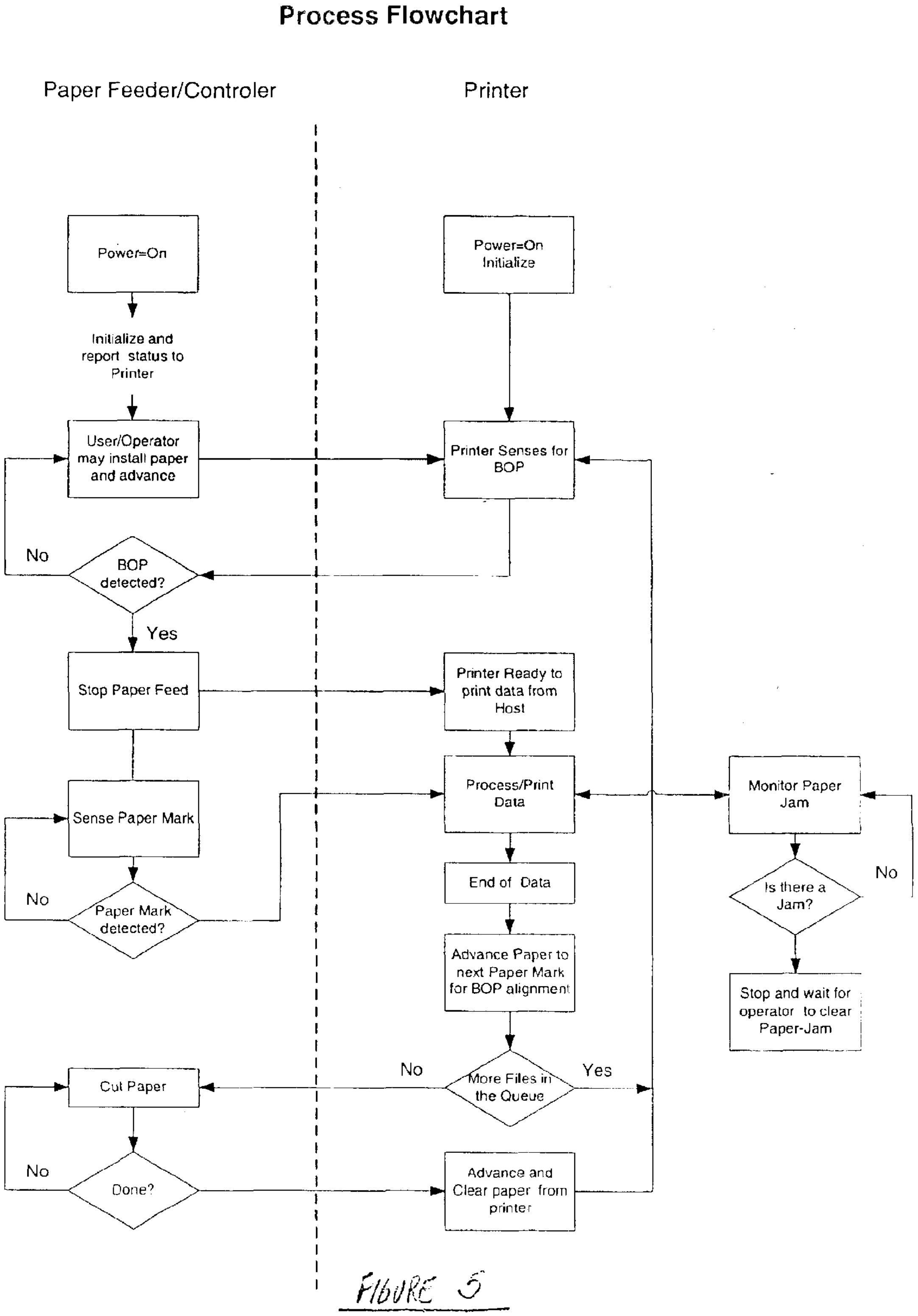
FIG. 5 provides a process flowchart describing one embodiment of the present invention.
Figure 6:
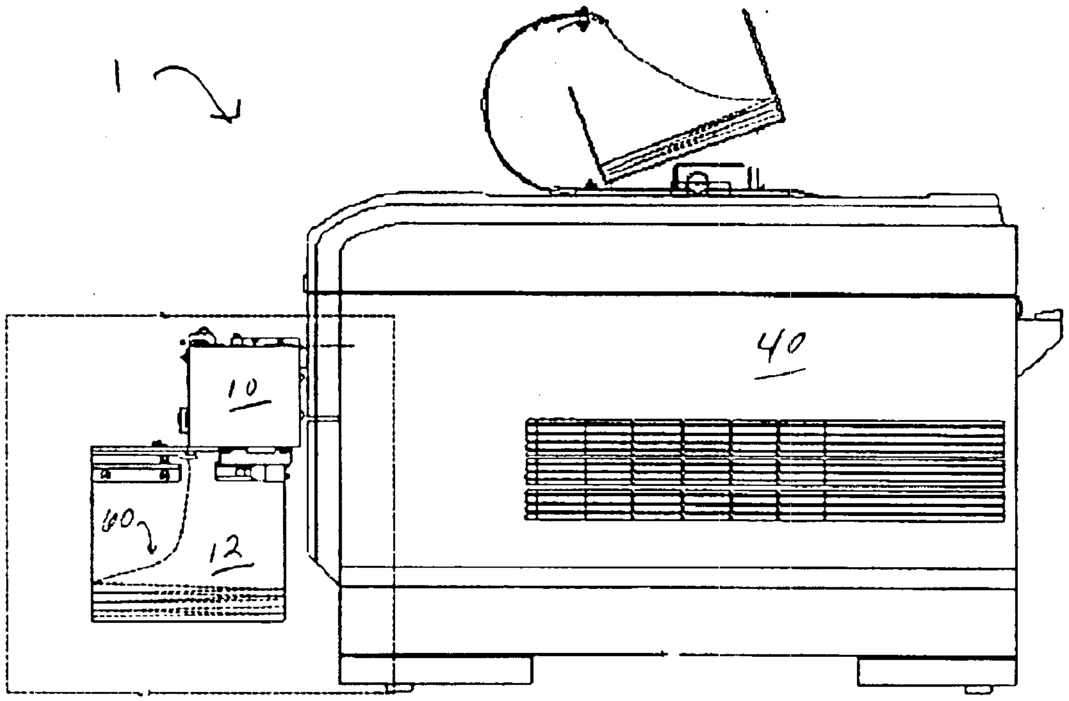
FIG. 6 depicts a side view in partial cross section of one embodiment of a paper handling and printer, including paper flow from a paper bin to a paper handler.

In FIG. 4, a timing diagram is depicted of one method of the present invention. “Paper Feed”, shown in negative logic, indicates movement of the top of paper 65 by the paper handler 10 to the printer inlet 41. “Paper Movement” represents movement of the paper stream 60 by the printer 40. “Top of Form” portrays sensing of the marks on the paper stream 60 by the optic sensor 13. “Data” indicates processing the print job by the printer 40 onto the paper stream 60. “EOD”, or end of data, illustrates a signal provided by the printer 40 indicating that the print job has been completed. “Paper Cut” depicts the paper being cut and “Paper In” represents the printer 40 sensing that paper is present within the printer inlet 41. The required modifications to the printer 40 can be readily determined by referencing FIG. 4.

Yet another novel feature of the present invention is the paper jam sensor 42 that monitors the paper exiting the printer 40 from the printer exit 43. The paper jam sensor 42 is comprised of a magnetized roller that rides on the paper exiting the printer 40. The exiting paper rotates the magnetized roller that in turn creates a detectable magnetic field. Disposed adjacent to the magnetic roller is a magnetic sensor that detects the magnetic field when the magnetized roller is rotating. The magnetic sensor is in operative communication with the printer 40 and transmits a signal to the printer 40 indicating the presence of a sensed magnetic field. Should the paper jam be somewhere within the printer 40, the magnetized roller will stop its rotation and the signal from the magnetic sensor to the printer 40 will go into a low state. The printer is programmed to immediately cease operation upon detection of a low state transmitted from the magnetic sensor. Due to the long lengths of paper that can be used with the present invention, stopping the printer 40 immediately upon detection of a paper jam can work to prevent damage to the internal printer components as well as preventing a potential fire hazard.

It is preferred that the drivers that command the printer can be editable software capable of being digitally stored on read/write devices, magnetic storage devices, optical storage devices, or any now or later developed media capable of storing data that is accessible for use with the printer. These digital data storage components can be within the printer, on portable storage devices (floppy disks, compact disks, etc.), or storage devices affixed in other hardware, such as hard drives within a personal computer or server type device.

EXAMPLE

In one example of use of the present invention continuous connected fan-fold paper has been used that is approximately 0.21 M (8.5 inches) in width and 0.158 M (6.25 inches) in length. The printer used is a modified Okidata 7200 series. The Okidata 7200 printer may be obtained via www.okidata.com. The preferred paper speed through the printer is 0.0758 M/s (3 inches/sec), however the range of paper speed includes up to 0.2 M/s (8 inches/sec). The drag force applied to the paper in this example is in the range of 0.8–1.11 N (3–4 ounces), more preferably 0.8 N (3 ounces).

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, while the preferred embodiment involves coupling a paper handler to an existing printer, the scope of the present invention includes a paper handler inherent within a printer that still possesses the advantages of the present invention. Further, the present invention is capable of use with single sheets of paper, as well as continuous sheets. These and other similar modifications will readily suggest themselves to those skilled in the art, and are intended to be encompassed within the spirit of the present invention disclosed herein and the scope of the appended claims.

What is claimed is:

1. A paper handler in combination with a printer comprising:

a paper inlet where paper enters said paper handler;

a paper exit where paper exits said paper handler from said paper handler to the inlet of the printer; and a drag system that bandies the paper to provide for continuous paper flow through the printer, wherein said drag system applies a drag force to the paper in the range of about 0.8 N to about 1.11 N.

2. The paper handler of claim 1, further comprising an optic sensor.

3. The paper handler of claim 1, where said paper handler is in communication with the printer.

4. The paper handler of claim 1, where said paper handling system produces a drag force onto the paper.

5. The paper handling system of claim 4, where said paper handling system produces a drag force onto the paper that is uniform across the width of the paper.

6. The paper handler of claim 1, wherein the paper is a paper stream comprising a continuous stream of paper.

7. The paper handler of claim 1 further comprising a programmable controller, where said controller is in operative communication with said paper handler and said printer.

8. The paper handler of claim 1 further comprising a paper cutter that cuts the paper within the paper handler, wherein said controller directs the operation of said paper cutter, monitors the operation of said paper cutter, and monitors the position of said paper cutter.

9. The paper handler of claim 8, where said paper handler controller operatively communicates with said paper cutter and directs said paper cutter to cut the paper within the paper handler.

10. The paper handler and printer combination of claim 1, where the printer is an off the shelf printer and modified to be in operative cooperation with said paper handler.

11. A paper handler in combination with a printer comprising:

a paper inlet where paper enters said paper handler;

a paper exit where paper exits said paper handler from said paper handler to the inlet of the printer; and an optic sensor, where said optic sensor senses marks on the paper and communicates with the printer indicating sensing of the marks by the optic sensor.

12. The paper handler of claim 11 further comprising an automatic paper advance system that automatically positions the paper proximate to the printer inlet.

13. The paper handler of claim 12, where the printer is provided with a paper sensor that senses paper at the printer inlet and where said automatic paper advance system is in communication with the printer such that when the printer senses paper in the printer inlet the automatic paper advance system terminates paper feed to the printer inlet.

14. A paper handler in combination with a printer comprising:

a paper inlet where paper enters said caper handler;

a paper exit where paper exits said paper handler from said paper handler to the inlet of the printer;

a drag system; and an optic sensor, where said drag system is comprised of a tension block disposed proximate to and parallel with a tension rod.

15. The paper handler of claim 14, where the paper is threaded between said tension block and said tension rod, where said tension block and said tension rod cooperate to exert a drag force on the paper.

16. A paper handler in combination with a printer comprising:

a paper inlet where paper enters said paper handler;

a paper exit where paper exits said paper handler from said paper handler to the inlet of the printer;

a paper cutter;

a motor; and a controller wherein said motor operatively advances paper through the paper handler, and wherein said controller controls the speed of said motor, the rate of deceleration of said motor, the rate of acceleration of said motor, the actuation of said motor, and the deactivation of said motor.

17. A method of handling a continuous feed of paper comprising:

directing paper into a paper handler;

directing the paper from the paper handler to the printer; and providing a drag force onto the paper with the paper handler in the range of about 0.8 N to about 1.1 N, thereby handling the paper with the paper handler to provide for continuous paper flow through the printer.

18. The method of claim 17 further comprising monitoring the paper travel through the printer to determine if a paper jam has occurred.

19. The method of claim 17 further comprising monitoring the status of a print job to determine the completion of a print job and advancing paper to the top of form position upon the completion of a print job.

20. The method of claim 17 further comprising determining if a print job is pending for printing and cutting the paper upon the completion of a print job and the determination that no print job is pending for printing.

21. The method of claim 17 further comprising operatively coupling said paper handler with the printer.

22. The method of claim 17 where said paper handler includes a paper handler controller and the printer includes a printer controller, where the paper handler controller monitors the paper handler and provides control commands to the paper handler and to the printer controller, and where the printer controller monitors the printer and provides control commands to the printer and to the paper handler controller.

23. The method of claim 22 further comprising modifying the printer to receive data from said paper handler and to transmit data to said paper handler.

24. The method of claim 23 further comprising modifying the printer controller to receive data from said paper handler controller and to transmit data to said paper handler controller.

25. A method of handling a continuous feed of paper comprising:

directing paper into a paper handler;

directing the paper from the paper handler to the printer;

providing a drag force onto the paper with the paper handler, thereby handling the paper with the paper handler to provide for continuous paper flow through the printer; and sensing the presence of the leading edge of the paper proximate to the printer inlet.

26. The method of claim 25 further comprising forwarding paper from the paper handler to the printer inlet until the leading edge of the paper is sensed proximate to the printer inlet.

27. The method of claim 25 further comprising drawing the leading edge of the paper into the printer inlet after the leading edge of the paper is sensed proximate to the printer inlet.

28. The method of claim 25 further comprising sensing for top of form indicators.

29. The method of claim 25 further comprising executing a print job after a top of form indicator has been sensed.

30. The method of claim 25 further comprising monitoring the paper travel through the printer to determine if a parer jam has occurred and monitoring the paper travel through the printer by directing the paper exiting the printer across a magnetized wheel thereby rotating the magnetized wheel when paper movement is occurring such that a detectable oscillating magnetic field is produced when the paper continues to exit the printer.

31. The method of claim 30 further comprising monitoring the magnetic field produced by the rotating magnetic wheel and terminating printer operations when the magnetic field ceases that is produced by the rotating magnetic wheel.

32. A method of printing onto a continuous stream of paper comprising the steps of:

coupling a paper handler with a printer;

adding top of form indicators to the continuous stream of paper;

feeding the leading edge of the continuous stream of paper through the paper handler to the paper inlet of the printer;

sensing for the top of form indicators;

receiving a print job into the printer; and monitoring when a top of form indicator has been sensed and initiate printing the print job onto the continuous stream of paper at that time.

* * * * *